(12) United States Patent
Keresman, III et al.

(10) Patent No.: US 8,170,954 B2
(45) Date of Patent: May 1, 2012

(54) SECURE AND EFFICIENT PAYMENT PROCESSING SYSTEM WITH ACCOUNT HOLDER DEFINED TRANSACTION LIMITATIONS

(75) Inventors: Michael A. Keresman, III, Kirtland Hills, OH (US); Ravishankar Bhagavatula, Yorba Linda, CA (US); Chandra Balasubramanian, Mentor-on-the-Lake, OH (US); Francis M. Sherwin, Cleveland Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 2577 days.

(21) Appl. No.: 10/011,690

(22) Filed: Nov. 13, 2001

(65) Prior Publication Data

US 2002/0046169 A1    Apr. 18, 2002

Related U.S. Application Data

(63) Continuation-in-part of application No. 09/488,297, filed on Jan. 20, 2000.

(60) Provisional application No. 60/157,304, filed on Oct. 1, 1999.

(51) Int. Cl.
*G06Q 40/00* (2006.01)
(52) U.S. Cl. ............................................. 705/44; 705/35
(58) Field of Classification Search ..................... 705/35, 705/42, 44
See application file for complete search history.

(56) References Cited

U.S. PATENT DOCUMENTS

| | | | |
|---|---|---|---|
| 3,806,874 A | 4/1974 | Ehrat |
| 3,906,460 A | 9/1975 | Halpern |
| 4,720,860 A | 1/1988 | Weiss |
| 4,747,050 A | 5/1988 | Brachtl et al. |
| 4,799,156 A | 1/1989 | Shavit et al. |
| 4,800,590 A | 1/1989 | Vaughan |
| 4,885,778 A | 12/1989 | Weiss |
| 5,168,520 A | 12/1992 | Weiss |
| 5,233,655 A | 8/1993 | Shapiro |
| 5,237,614 A | 8/1993 | Weiss |
| 5,323,465 A | 6/1994 | Avarne |
| 5,361,062 A | 11/1994 | Weiss et al. |
| 5,444,444 A | 8/1995 | Ross |
| 5,479,512 A | 12/1995 | Weiss |
| 5,479,519 A | 12/1995 | Davis |
| 5,485,519 A | 1/1996 | Weiss |

(Continued)

FOREIGN PATENT DOCUMENTS

CA    2340621    5/1999
(Continued)

OTHER PUBLICATIONS

Japanese Patent Office "Notification of Reasons for Rejection", date of mailing, Feb. 9, 2010.

(Continued)

*Primary Examiner* — Jagdish Patel
*Assistant Examiner* — Sara Hamilton
(74) *Attorney, Agent, or Firm* — Fay Sharpe LLP (57) ABSTRACT

A method for carrying out commercial transactions includes establishing a transaction processing system on an electronic communications network, and establishing an account within the transaction processing system for a corresponding account holder. One or more descriptions of acceptable future commercial transactions related to the account are obtained from the account holder. Commercial transactions carried out via the transaction processing system are administered, and it is verified that administered commercial transactions related to the account meet one or more of the descriptions obtained.

18 Claims, 7 Drawing Sheets

U.S. PATENT DOCUMENTS

| | | | |
|---|---|---|---|
| 5,491,752 A | 2/1996 | Kaufman et al. | |
| 5,557,518 A | 9/1996 | Rosen | |
| 5,590,197 A | 12/1996 | Chen et al. | |
| 5,625,694 A | 4/1997 | Lee et al. | |
| 5,655,023 A | 8/1997 | Cordery et al. | |
| 5,657,388 A | 8/1997 | Weiss | |
| 5,692,132 A | 11/1997 | Hogan | |
| 5,715,314 A | 2/1998 | Payne et al. | |
| 5,742,683 A | 4/1998 | Lee et al. | |
| 5,742,684 A | 4/1998 | Labaton et al. | |
| 5,757,917 A | 5/1998 | Rose et al. | |
| 5,761,306 A | 6/1998 | Lewis | |
| 5,781,632 A | 7/1998 | Odom | |
| 5,790,667 A | 8/1998 | Omori et al. | |
| 5,790,677 A | 8/1998 | Fox et al. | |
| 5,809,144 A | 9/1998 | Sirbu et al. | |
| 5,815,665 A | 9/1998 | Teper et al. | |
| 5,825,881 A | 10/1998 | Colvin, Sr. | |
| 5,826,245 A | 10/1998 | Sandberg-Diment | |
| 5,850,442 A | 12/1998 | Muftic | |
| 5,880,446 A | 3/1999 | Mori et al. | |
| 5,887,065 A | 3/1999 | Audebert | |
| 5,903,830 A | 5/1999 | Joao et al. | |
| 5,903,878 A | 5/1999 | Talati et al. | |
| 5,909,492 A | 6/1999 | Payne et al. | |
| 5,937,068 A | 8/1999 | Audebert | |
| 5,943,423 A | 8/1999 | Muftic | |
| 5,956,699 A | 9/1999 | Wong et al. | |
| 5,987,440 A | 11/1999 | O'Neil et al. | |
| 5,988,497 A | 11/1999 | Wallace | |
| 5,991,411 A | 11/1999 | Kaufman et al. | |
| 5,991,413 A | 11/1999 | Arditti et al. | |
| 5,995,626 A | 11/1999 | Nishioka et al. | |
| 5,999,624 A | 12/1999 | Hopkins | |
| 6,005,939 A | 12/1999 | Fortenberry et al. | |
| 6,012,039 A | 1/2000 | Hoffman et al. | |
| 6,012,045 A | 1/2000 | Barzilai et al. | |
| 6,014,650 A | 1/2000 | Zampese | |
| 6,029,150 A | 2/2000 | Kravitz | |
| 6,047,270 A * | 4/2000 | Joao et al. | 705/44 |
| 6,065,117 A | 5/2000 | White | |
| 6,108,644 A | 8/2000 | Goldschlag et al. | |
| 6,161,183 A | 12/2000 | Saito et al. | |
| 6,163,771 A | 12/2000 | Walker et al. | |
| 6,173,269 B1 * | 1/2001 | Solokl et al. | 705/35 |
| 6,205,437 B1 * | 3/2001 | Gifford | 705/75 |
| 6,226,624 B1 * | 5/2001 | Watson et al. | 705/44 |
| 6,315,193 B1 | 11/2001 | Hogan | |
| 6,381,587 B1 | 4/2002 | Guzelsu | |
| 6,456,984 B1 | 9/2002 | Demoff et al. | |
| 6,678,664 B1 * | 1/2004 | Ganesan | 705/39 |
| 7,003,495 B1 * | 2/2006 | Burger et al. | 705/50 |
| 7,080,037 B2 * | 7/2006 | Burger et al. | 705/50 |
| 7,383,213 B1 * | 6/2008 | Walter | 705/35 |
| 2001/0047336 A1 * | 11/2001 | Maycock et al. | 705/44 |
| 2002/0055911 A1 * | 5/2002 | Guerreri | 705/64 |
| 2002/0099665 A1 * | 7/2002 | Burger et al. | 705/67 |
| 2002/0123938 A1 * | 9/2002 | Yu et al. | 705/26 |
| 2002/0152158 A1 * | 10/2002 | Paleiov et al. | 705/39 |
| 2004/0034598 A1 * | 2/2004 | Robinson | 705/44 |

FOREIGN PATENT DOCUMENTS

| | | |
|---|---|---|
| EP | 0668 579 A2 | 8/1995 |
| JP | 08-096034 | 4/1996 |
| JP | A-H08-96034 | 4/1996 |
| JP | 09212549 | 8/1997 |
| JP | A-H10-171909 | 6/1998 |
| JP | 10-207946 | 8/1998 |
| WO | WO 90/01199 | 2/1990 |
| WO | WO 93/04425 | 3/1993 |
| WO | WO 98/21679 | 5/1998 |

OTHER PUBLICATIONS

Japanese Office Action dated Sep. 14, 2010.

Hitachi Commerce Solution Shopping System Mall Establishment Guide, Hitachi Ltd., Mar. 1998, Ver. 2. pp. 1-31 (including English translation of portion of document).

Canadian Office Action Oct. 19, 2009.

Endeshaw A., The Proper Law for Electronic Commerce; Information & Communciations Technology Law. Abingdon: Mar. 1998.

Ferranti, M., "Businesses bracing for on-line transactions", Network World Canada. DOwnsview: Mar. 27, 1998.

* cited by examiner

SECURE AND EFFICIENT PAYMENT PROCESSING SYSTEM WITH ACCOUNT HOLDER DEFINED TRANSACTION LIMITATIONS

This application is a continuation-in-part of U.S. application Ser. No. 09/488,297, filed Jan. 20, 2000, which claims the benefit of U.S. Provisional Application No. 60/157,304, file Oct. 1, 1999.

BACKGROUND OF THE INVENTION

The present invention relates to the art of Internet commerce. It finds particular application in conjunction with Internet credit and/or debit transactions, and will be described with particular reference thereto. However, it is to be appreciated that the present invention is also amenable to other like applications.

Internet commerce, or e-commerce as it is otherwise known, relates to the buying and selling of products and services over the Internet. The convenience of shopping over the Internet has sparked considerable interest in e-commerce on behalf of both buyers and sellers. Internet sales or like transactions have been typically carried out using standard credit and/or debit cards such as Visa®, MasterCard®, Discover®, American Express®, or the like. However, while widely used for more traditional face-to-face transactions, use of these standard cards and their associated processing systems in connection with e-commerce presents certain difficulties.

In particular, for example, the standard card transactions typically involve a relatively high number of intermediaries that are used in processing the transaction from an initial purchase request, through authentication and authorization, and ultimately to settlement. In addition to the actual buyer and seller, the cast involved in ultimately completing the transaction through to settlement typically entails member banks including a merchant or acquiring bank and an issuing bank. Often, an Internet processor (e.g., Cybercash), member service provider (MSP), or an independent sales organization (ISO) is also involved. Additionally, third party processors, agent banks, and/or deposit banks are commonly employed. As each intermediary charges a bulk, per-transaction, percentage, or other like fee for its role in handling the transaction, the total transaction cost grows with each additional intermediary employed. Consequently, streamlining transaction processing and elimination of intermediaries beneficially holds transaction costs down.

Buyer confidence and security are also issues facing Internet commerce. The fact that e-commerce transactions are not carried out face-to-face often creates apprehension in a potential buyer regarding transactions. This apprehension is fueled by uncertainty of the reputation or quality of the seller with whom they are dealing and the security of their credit and/or debit card information or other personal information (e.g., address, credit card number, phone number, etc.) typically submitted along with a traditional credit or debit card e-commerce transaction. Additionally, the account holders, sellers and financial institutions are concerned about safeguarding against fraudulent or otherwise unauthorized transactions.

For example, once an initial transaction has taken place, wherein a customer or account holder provides their identification and account information to a seller, the seller, whether operating via the Internet or via a traditional brick and mortar store front, has all the information needed to accidentally or fraudulently charge a customers account for goods or services that were not actually purchased. Furthermore, every employee of the seller who comes into contact with the customer identification and account information has the ability to use that information to initiate fraudulent transactions.

Similarly, sellers or merchants as well as funding sources are concerned that purchases are made by valid account holders. As outlined above, the fact that some one has access to an account number and other identifying information is not a guarantee that a customer is the authorized account holder. For example, children can use a parent's credit cards without permission, resulting perhaps in returned merchandise. Credit cards or account information can be lost or stolen and used by unauthorized personnel to make purchases resulting in one of the account holder, the merchant, or the funding source suffering a theft loss. Additionally, data entry errors and the like can result in multiple charges for a single purchase.

Yet another issue is convenience for the buyer. As more and more transactions are carried out online, the repeated typing of required transaction information such as, for example, name, credit or debit account information, and/or shipping address information becomes tedious and aggravating. Furthermore, writing checks to settle accounts is a tedious and often overlooked task resulting in delayed payment for sellers and late charges for consumers.

The present invention contemplates a new and improved transaction processing system and technique for carrying out credit and/or debit transactions over the Internet that overcomes the above-referenced problems and others.

BRIEF SUMMARY OF THE INVENTION

In accordance with one aspect of the present invention, a method for carrying out commercial transactions is provided. The method includes establishing a transaction processing system on an electronic communications network, and establishing an account within the transaction processing system for a corresponding account holder. One or more descriptions of acceptable future commercial transactions related to the account are obtained from the account holder. Commercial transactions carried out via the transaction processing system are administered, and it is verified that administered commercial transactions related to the account meet one or more of the descriptions obtained.

In accordance with another aspect of the present invention, a method of processing commercial transactions is carried out over the Internet between account holders and participating merchants. The method includes establishing account privileges for each account holder's account. The privileges defining boundaries outside of which transactions are not to be authorized. A buyer's purchase request is received from a participating merchant indicating that the buyer desires to carry out a transaction with the merchant in which the buyer is purchasing one or more selected items from the merchant. The buyer is authenticated as an account holder, and transaction details are received from the participating merchant. The transaction details including a cost for the selected items. Authorizing completion of the transaction occurs when the transaction details do not violate established account privileges and the account holder's account is full enough to cover the cost.

One advantage of the present invention is found in an automated account settlement aspect that includes reasonableness checking of submitted charges.

Another advantage of the present invention resides in immediate and automatic notification generation when out of tolerance charges are submitted.

Another advantage of the present invention is that buyers and sellers are protected from fraudulent or otherwise unauthorized transactions.

Yet another advantage of the present invention is that transaction costs are reduced to the extent that streamlined processing reduces intermediaries that would otherwise contribute to the transaction costs.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT(S)

Figure 1:
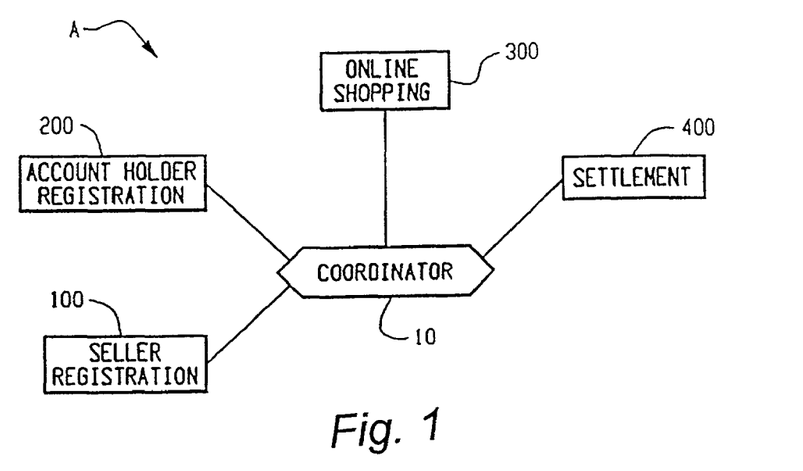
FIG. 1 is a flow chart showing a high level overview of an online credit/debit transaction processing system in accordance with aspects of the present invention.

With reference to FIG. 1, a central transaction coordinator 10 administers a number of different yet inter-dependent processes in a commercial Internet credit/debit transaction processing system A. The processes administered by the coordinator 10 include: (i) a seller registration process 100 wherein merchants or sellers are signed up for participation in the transaction processing system A; (ii) an account holder registration processes 200 wherein buyers or consumers are signed up as account holders for participation in the transaction processing system A; (iii) an online shopping process 300 wherein buyers or consumers engage in online commercial transactions with merchants or sellers; and, (iv) a settlement process 400 wherein completed commercial transactions are confirmed and settlement information forwarded directly to a funding source for billing and payment processing. In addition, the coordinator 10 itself optionally acts as the funding source. However, in the interest of simplicity and clarity, in the following description, the discussion is directed to embodiments employing a third party funding source.

Figure 2:
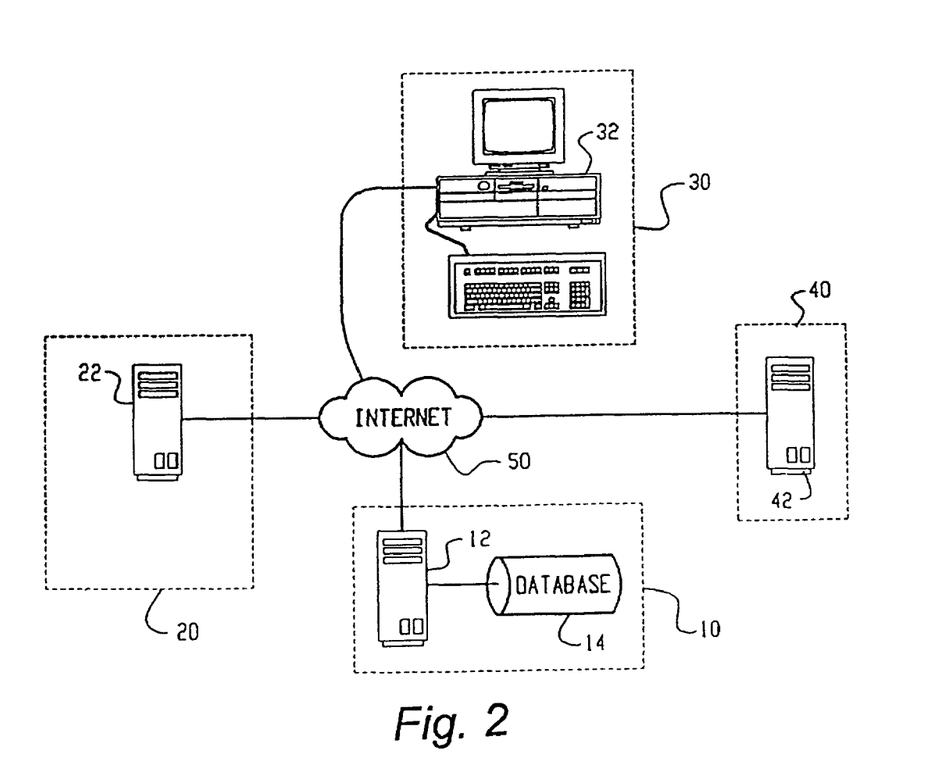
FIG. 2 is a diagrammatic illustration showing Internet connected participants in an online credit/debit transaction processing system in accordance with aspects of the present invention.

With further reference to FIG. 2, in a preferred embodiment, the coordinator 10 maintains a presence on the Internet 50 or other like online network via a server 12. A merchant or seller 20 also maintains a presence on the Internet 50 via a server 22. A buyer or account holder 30 gains access to the seller 20 and/or the coordinator 10 over the Internet 50 using a computer 32 with an appropriate web browser or other like software running thereon. Of course, the transaction processing system A is preferably administered to multiple similarly situated sellers 20 and buyers 30. However, in the interest of simplicity herein, only a one of each are shown in FIG. 2. Additionally, a funding source 40 maintains a presence on the Internet 50 via a server 42. The funding source 40 extends credit for credit accounts or holds deposits for debit accounts created on behalf of account holders participating in the transaction processing system A. Moreover, it is to be appreciated that the security of the transaction processing system A is further enhanced by encrypting, with known encryption techniques, communications relayed or otherwise transmitted over the Internet 50.

Figure 3:
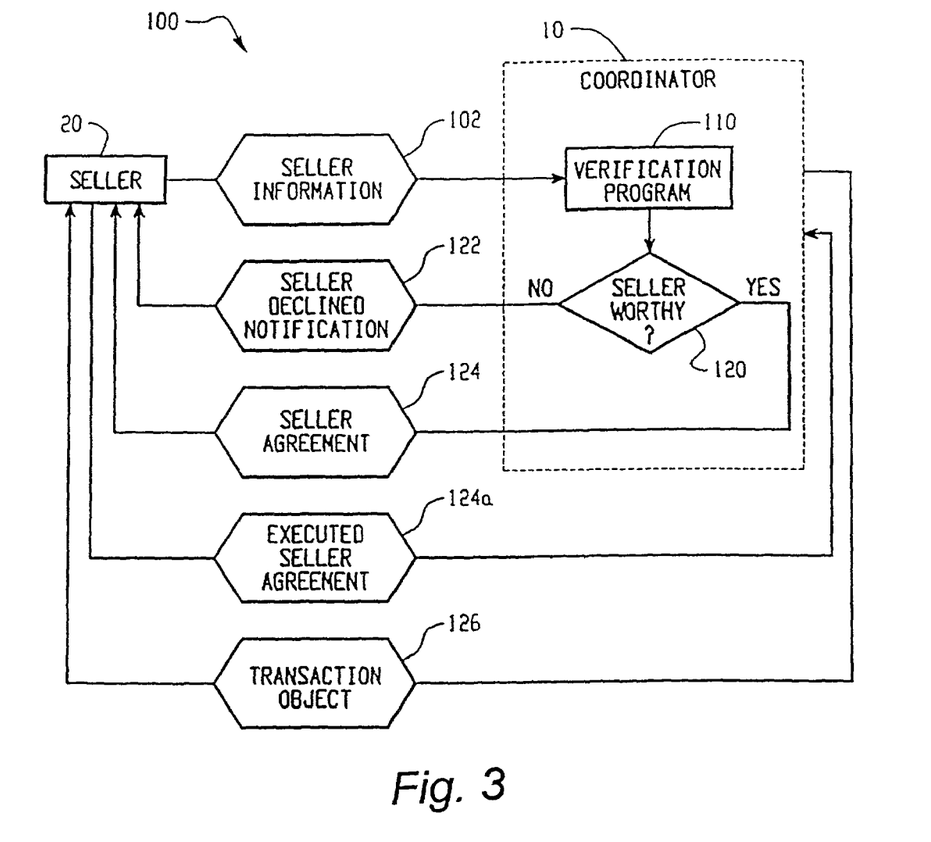
FIG. 3 is a flow chart showing a process for registering sellers for participation in an online credit/debit transaction processing system in accordance with aspects of the present invention.

With further reference to FIG. 3, in the seller registration process 100, an interested merchant or seller 20, preferably doing business on the Internet 50 via their server 22, is registered for participation in the transaction processing system A administered by the transaction coordinator 10. The seller registration process 100 begins with the coordinator 10 receiving seller information 102 (e.g., financial information, physical address, category of good or services sold, Internet address, email address, etc.) from the seller 20. Online or over the Internet 50, this is optionally accomplished by receiving the seller information 102, perhaps encrypted, via the coordinator's server 12. Using the received seller information 102, the worthiness of the seller 20 for participation in the transaction processing system A is evaluated.

Preferably, a verification program 110 is applied to evaluate the seller 20 based on the seller information 102 received by the coordinator 10. The verification program 110, optionally running on the coordinators server 12, is carried out using a predetermined or otherwise selected algorithm that acts on quantifiable values representing the seller information 102. In this manner, the seller's credit worthiness is determined and/or the seller's reliability and reputation for customer service and sound business practice is determined using objective, subjective, or a combination of objective and subjective criteria. Accordingly, the coordinator 10 ensures that the seller 20 is able to meet potential obligations. Moreover, account holders 30 participating in the transaction processing system A are reassured that they are patronizing high quality merchants or sellers with strong customer satisfaction guarantees.

In response to the evaluation, at decision step 120, the coordinator 10 decides whether or not the interested seller 20 is declined or approved for participation. If declined, a notification 122 is sent to the interested seller 20 and the seller registration process 100 ends. If approved, the coordinator 10 forwards a seller agreement 124 to the seller 20. Online or over the Internet 50, the seller agreement 124 is optionally forwarded from the coordinator's server 12 to the seller's server 22. The seller agreement 124 outlines the rights and responsibilities or duties of the seller 20 with respect to their participation in the transaction processing system A. After the seller 20 physically signs, electronically signs, or otherwise executes the seller agreement 124, it is returned to the coordinator 10, perhaps through the coordinator's server 12. Upon receipt of the executed seller agreement 124a, the coordinator 10 creates and maintains a record of the seller information 102, the seller's approval, the seller agreement 124, etc. Preferably, the record is electronically created and maintained in a coordinator's database 14 which is accessible by the coordinator 10, and optionally, the funding source 40.

Preferably, upon acceptance of the executed seller agreement 124a, the coordinator 10 forwards to the seller 20 a transaction object 126 which places a link on the seller's online shopping check-out page or otherwise runs on the seller's server 22. The object or link operates to integrate the transaction processing system A into, or otherwise allows the processing system A to be accessed through, the seller's online shopping system or Internet shopping web page or pages. Optionally, the coordinator 10 installs the object on the seller's server 22. Accordingly, account holders 30 shopping online or over the Internet 50 can access the object (e.g., by clicking the link on seller's check-out web page) and be automatically routed to the coordinator 10 for authentication and/or authorization. In this manner then, merchants or sellers 20 become registered for participation in the transaction processing system A.

Figure 4:
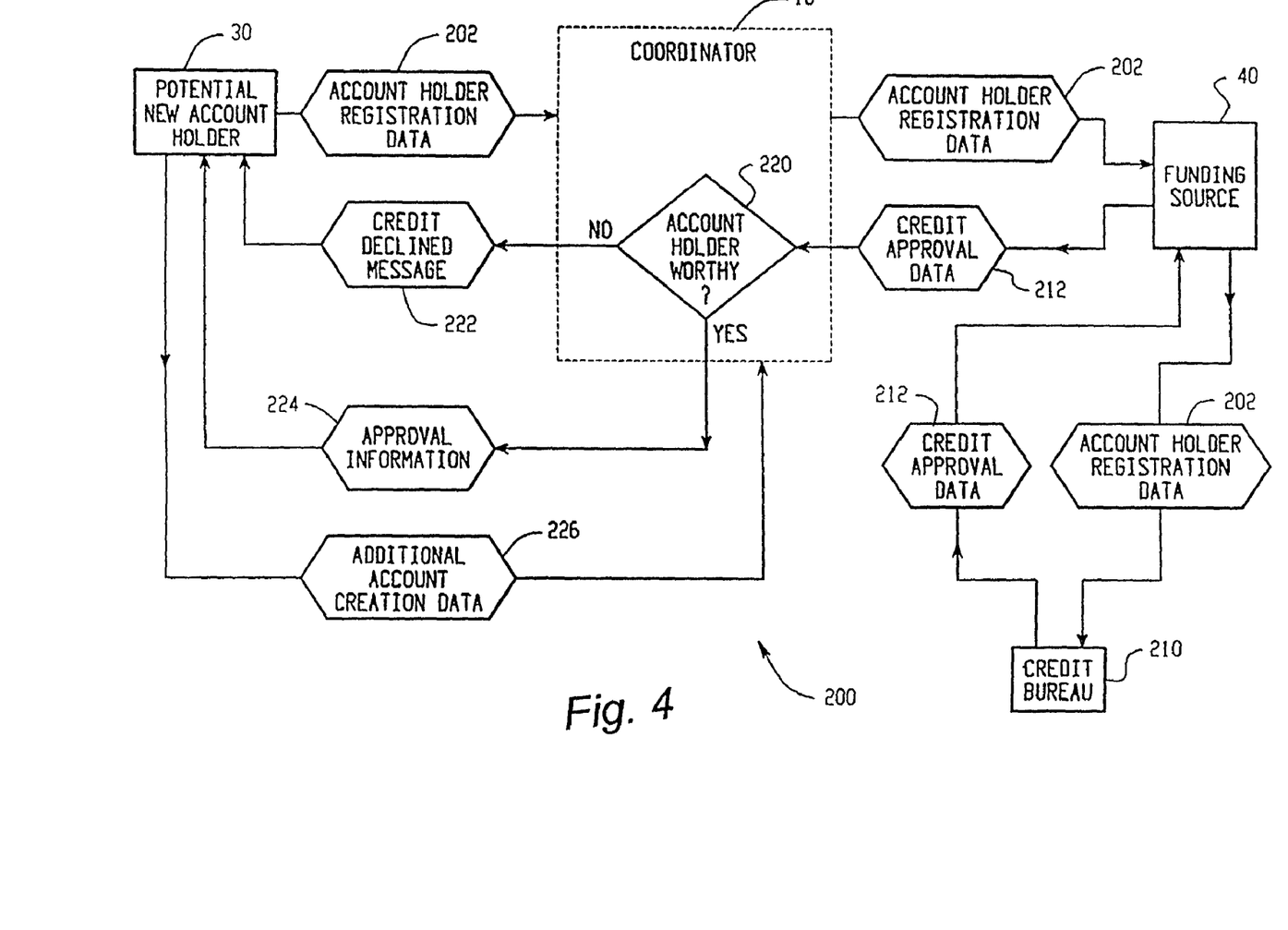
FIG. 4 is a flow chart showing a process for registering account holders for participation in an online credit/debit transaction processing system in accordance with aspects of the present invention.

With further reference to FIG. 4, in the account holder registration process 200, registration of a buyer or consumer to become an account holder 30 begins with a visit by the buyer to the coordinator 10. Optionally, over the Internet, the interested buyer or consumer, using an appropriate web browser, accesses an account holder registration page which is made available via the coordinator's sever 12. As the account holder registration process 200 continues, account holder registration data 202 (e.g., name, address, length at residence, own or rent residence, e-mail address, home phone number, work phone number, social security number, date of birth, mother's maiden name, employer, income, employment status, etc.) is collected or otherwise obtained by the coordinator 10 from the buyer or the potential new account holder 30 who is making application for participation in the transaction processing system A. Prior to accepting the consumer or buyer as a new account holder 30, their credit worthiness is evaluated.

Preferably, the coordinator 10 passes relevant account holder registration data 202 to the funding source 40. The relevant account holder registration data 202 is then analyzed for credit worthiness. Optionally, the data is analyzed by the funding source's own credit approval system, or it is passed on to one or more credit bureaus 210 for analysis. The analysis preferably includes the application of known credit approval techniques and algorithms which determine credit worthiness. Ultimately, credit approval data 212 (e.g., approval or denial, amount of credit, risk, etc.) is routed back to the coordinator 10 through the funding source 40.

Upon receipt of the credit approval data 212, the coordinator 10 decides, at decision step 220, if the potential new account holder 30 is worthy of participation in the transaction processing system A. Then the coordinator 10 notifies the potential new account holder 30 of the credit decision. That is to say, if credit is declined, a credit-declined message 222 is communicated to the potential account holder 30. On the other hand, if credit is approved, approval information 224 (e.g., the annual percentage rate, credit limit, etc.) is communicated to the potential new account holder 30 for acceptance. In a preferred embodiment, the credit approval or denial is communicated to an online potential new account holder 30 accessing the coordinator over the Internet 50 by displaying an appropriate web page from the coordinator's server 12 to the potential new account holder 30. Alternately, the credit approval or denial is communicated via e-mail to the potential new account holder's designated email address previously obtained along with the account holder registration data 202. In any event, optionally, at this time, the potential new account holder 30 is advanced an initial, albeit preferably limited, line of credit and temporary password enabling him to immediately shop online at a registered seller 20 using the transaction processing system A administered by the transaction coordinator 10.

If approved and account holder status is still desired, along with an indication of acceptance, the account holder 30 supplies the coordinator 10 with additional account creation data 226 including a secret personal identification number (PIN) and the answers to a number of designated or otherwise selected security questions. The security questions are preferably questions to which only the account holder 30 is likely to know the answers (e.g., the account holder's first car, the name of the account holder's dog, the maiden name of the account holder's mother, etc.). Upon acceptance, the coordinator 10 creates and maintains a record for the account holder 30, preferably in electronic format on the coordinator's database 14. The account holder record includes the account holder registration data 202, credit approval data 212, approval information 224, acceptance, and the additional account creation data 226. In addition, a corresponding credit account is created with the funding source 40. Optionally, the account holder 30 may designate one or more existing credit or debit accounts for use in connection the transaction processing system A, in which case information pertaining thereto is collected and maintained in the account holder record.

The account holder record may also contain information or data relating to account privileges. In a preferred embodiment the account holder 30 has the option to customize or modify their account privileges. The account privileges are customized by the account holder 30, for example, by accessing the coordinator's server 12 over the Internet 50. For security purposes, the account holder is optionally authenticate as such, preferably, using the below described authentication procedure, prior to permitting any account modifications. However, at initial account creation, the below described authentication procedure is not employed. The account privileges are optionally set by the account holder 30 to limit the use of the account holder's account in the transaction processing system A. That is to say, the set account privileges may restrict the account so that purchases thereon are not authorized for specified participating merchants or sellers 20, so that automatically recurring transactions carried out absent the direct participation of the account holder 30 are not authorized, so that single purchases over a certain price limit are not authorized, so that aggregate per day purchases are limited to a desired level, and the like.

By manipulating the account privileges, the account holder 30 may selectively set up virtual purchase orders and control or limit the transaction authorization given by the coordinator 10. For example, the account privileges portion of the account holder record preferably identifies those registered merchants or sellers 20 for which the account holder 30 may desire or intend to due business and hence for which transactions on the account are to be authorized. Optionally, to add and delete registered sellers 20 from the list, the coordinator 10 provides selection boxes. For example, the account holder 30, interacting with the server 12 of the coordinator 10, to provide the additional account creation data 226, may choose to globally authorize or globally de-authorize all the registered sellers. Then the account holder 30 may switch the authorization state of individual sellers. For example, where the account holder globally authorizes all available registered sellers 20, the account holder 30 may then de-authorize particular individual sellers 20. For example, the account holder 30 de-selects merchants the account holder 30 does not intend to do business with, thereby deleting them from the authorized merchant list. Conversely, where the account holder 30 globally de-authorizes all available registered sellers 20, the account holder 30 may then select particular individual sellers, thereby adding them to the authorized merchant list. Other global restrictions optionally include, restricting authorization for single purchases exceeding a selected amount, or for aggregate purchases in a selected time period.

An account holder 30 selectively sets up a virtual purchase order via the account privileges by pre-defining transaction boundaries for an identified seller 20. The boundaries optionally include a limit on the transaction amount, a limit on the number of transactions for automatically or otherwise repeating transactions, a purchase order expiration data after which repeating transactions are not longer to be authorized, a frequency (e.g., weekly, monthly, etc.) at which repeating transactions are to be authorized, ranges and/or tolerances within which transaction amounts and/or dates are to fall, etc. In this manner, the authorization of anticipated transactions is controlled by the account holder 30 prior to the execution of the transactions. Consequently, accidental and/or fraudulent transactions are frustrated. Additionally, insomuch as authorization will be denied for transactions not in conformity with the boundaries of the virtual purchase order prior to charging the designated account, charge backs, billing disputes and the like will be reduced.

In any event, at the initial account creation, the coordinator 10 also assigns the account holder 30 an associated user identity which is unique to the account holder 30 and becomes part of the account holder's record (e.g., a self-selected user name, or an otherwise assigned alpha-numeric designation), and optionally, a corresponding credit token 230 (see FIG. 5) is issued to the account holder 30. The credit token 230 periodically (e.g., every 60 seconds) generates a non-predictable alpha-numeric code (preferably 6 characters in length) using a predetermined or otherwise selected algorithm. The algorithm used in generating the periodically changing non-predictable alpha-numeric code is preferably a function of an initial seed value and a time value obtained from an internal clock. The credit token 230 renders the code on an incorporated liquid crystal display (LCD) readout 232 or other like human-viewable display. Additionally, the credit token 230 provides an indicator as to the duration of the displayed code's validity (i.e., the time remaining before generation of the next non-predictable code). Accordingly, every period, the credit token 230 generates a dynamically changing non-predictable alpha-numeric code which (with the exception of the coordinator 10) is only available to the account holder 30 in possession of the credit token 230.

Figure 5:
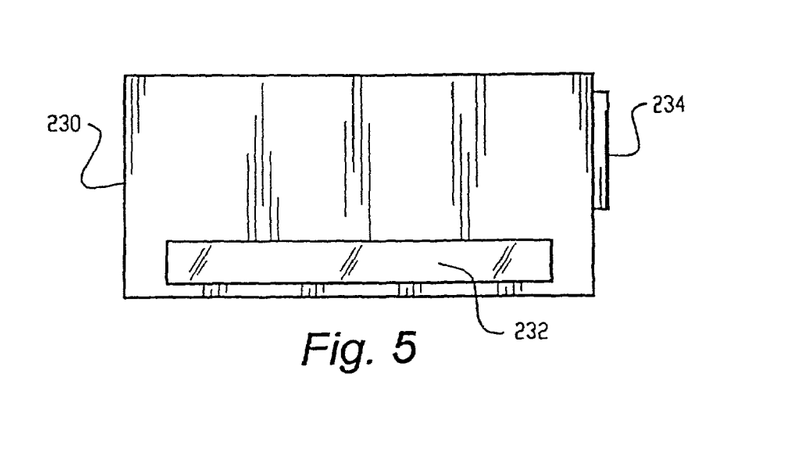
FIG. 5 is a diagrammatic illustration showing a credit token for use in connection with an online credit/debit transaction processing system in accordance with aspects of the present invention.

For each unique user identity, the coordinator 10 also independently generates a periodically changing non-predictable alpha-numeric code which is synchronized with and the same as the token generated code for the corresponding account holder 30 having that user identity. The independently generated and synchronized code is maintained with the corresponding account holder's record. Preferably, the coordinator 10 generates the synchronized code by running software which uses (i) an algorithm and (ii) an initial seed value which are both identical to that used by the corresponding token 230 and (iii) a time value from a clock which is synchronized with the token's internal clock. In this manner then, the alpha-numeric code from an account holder's credit token 230 and the independently generated alpha-numeric code maintained with the account holder's record are the same at any given time.

In an alternate preferred embodiment, the token 230 stores a defined set of discrete random or quasi-random numbers which are pre-loaded onto the token 230 at the time of the token's manufacture or programming. These numbers are preferably generated by an external system (e.g., a computer system or other random number generating device). The external system then delivers the number set to the token 230 for storage in the token's internal memory. Likewise, the same number set is delivered to and maintained with the corresponding account holder record.

Generating the numbers on an external system relieves the token 230 of a significant amount of computational overhead. By reducing the computational overhead, energy savings are realized that enable the token to use smaller, less powerful energy sources.

The random numbers are dispensed by the token 230 to a user by pressing a button on the token 230 or otherwise signaling the token 230. Optionally, the token 230 may need to be activated by using the secret PIN that was assigned to, or chosen by, the account holder 30 at the time of registration. In any event, a dispensed number from the token 230 may then be cross referenced against those in the corresponding account holder record. In this way, authentication can be carried out.

In an alternate embodiment, a potential new account holder 30 may contact the funding source 40 directly for registration to participate in the transaction processing system A. In this case, the funding source carries out substantially the same account holder registration process 200 and forwards the account holder record to the coordinator 10.

Figure 6A:
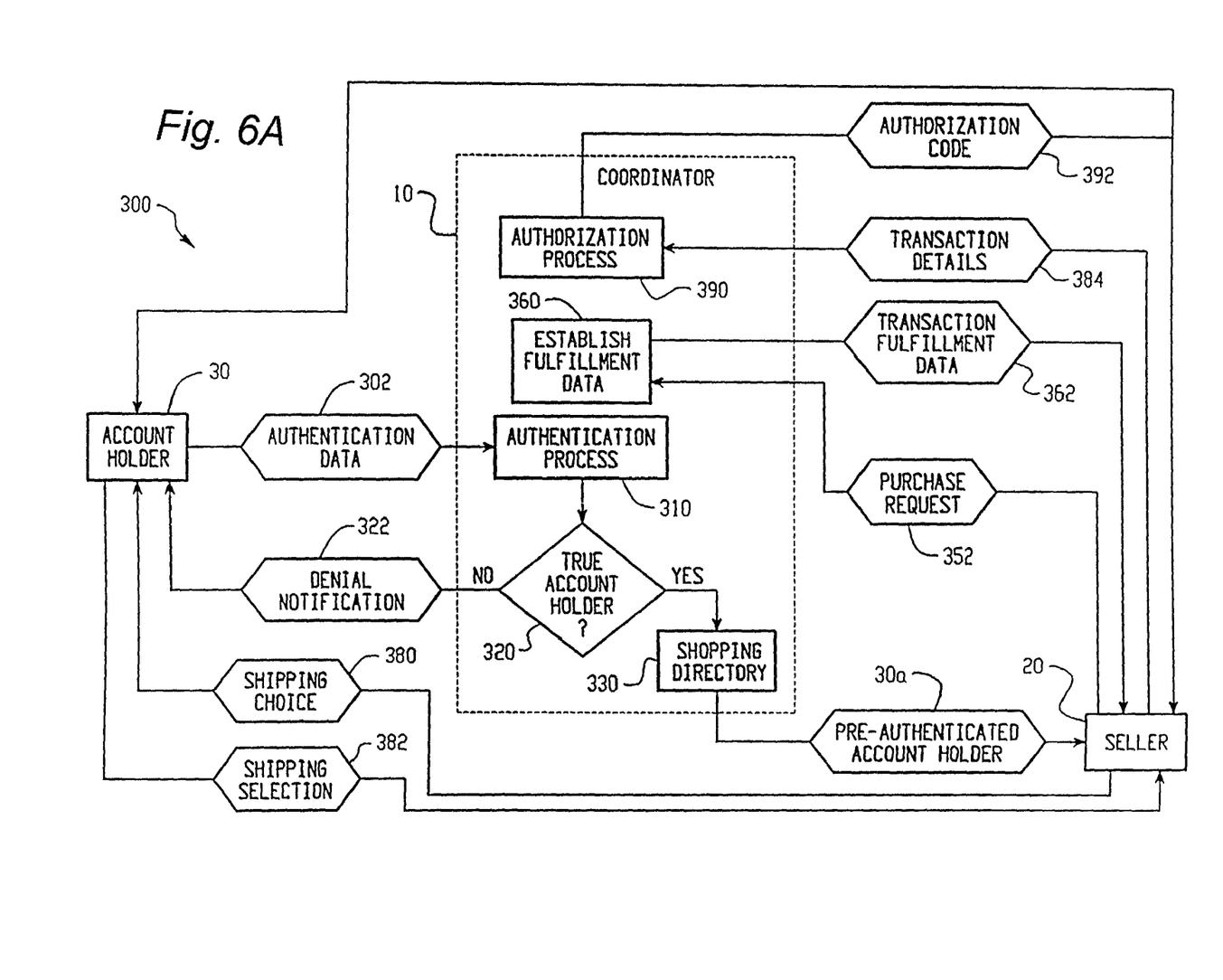
FIGS. 6A and 6B are flow charts showing an online shopping experience and related processing in accordance with aspects of the present invention with pre-shopping authentication and post-shopping authentication, respectively.
Figure 6B:
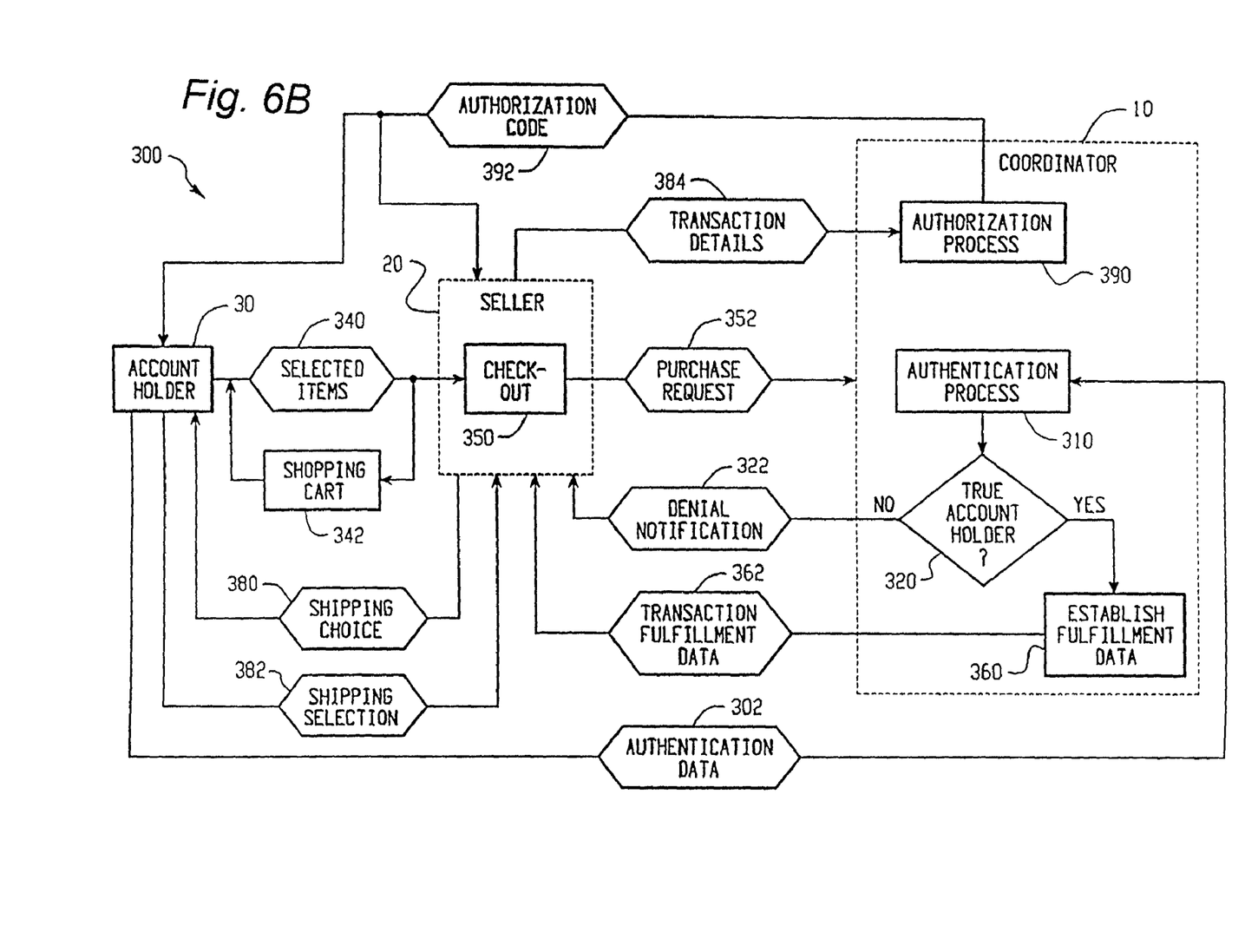

With further reference to FIGS. 6A and 6B, in a preferred embodiment, an online or Internet shopping experience or process 300 begins with an account holder 30 contacting the coordinator 10 (e.g., accessing the coordinator's online or Internet shopping portal using an appropriate web browser) or otherwise requesting a web page from or linking to the coordinator's server 12. At this juncture, the account holder 30 is given the option to pre-authenticate their identity prior to engaging in any particular commercial transactions with the participating merchants or sellers. Authentication is preferably accomplished by the coordinator 10 collecting from the account holder 30 authentication data 302 having one or more elements including the account holder's user identity, PIN, and/or token generated alpha-numeric code. Optionally, one or more elements of the authentication data 302 are entered manually by the account holder 30. Alternately, one or more of the elements are stored or otherwise maintained on the computer 32 being employed by the account holder 30 to access the coordinator's server 12 such that they are automatically entered where appropriate. For example, with regard to the non-predictable alpha-numeric code, rather than having a separate physical token 230, the "token" is optionally an object running on the account holder's computer 32 which enters or displays the alpha-numeric code when accessed. Alternately, a separate physical token 230 optionally includes an interface 234 (see FIG. 5) through which it is connected to the account holder's computer such that the token generated alpha-numeric code is read directly from the token 230 without manual entry.

In any event, the coordinator 10 runs the authentication data 302 through an authentication process 310 which compares the entered or otherwise collected authentication data 302 with the corresponding data in the account holder record having the same user identity as that included with the authentication data 302. The coordinator 10 then determines, at decision step 320, whether or not the alleged account holder 30 is an authentic account holder previously registered using the account holder registration process 200. Of course, where the user identity included with the authentication data 302 does not have a corresponding account holder record or is otherwise invalid, the authentication is denied or fails and the alleged account holder 30 and/or involved seller 20 is sent a denial notification 322. Additionally, where the authentication data 302 and corresponding data in the account holder record having the same user identity do not match, the authentication is also denied or fails and the alleged account holder 30 and/or involved seller 20 is again sent the denial notification 322. Only when there is an identical match between the authentication data 302 and the account holder record does the accessing account holder 30 become authenticated and/or positively identified as the true account holder having the corresponding user identity.

In one preferred embodiment, the authentication or positive identification is carried out, e.g., as described in the previously referenced U.S. Pat. Nos. 5,168,520 and 4,720,860. Alternately, other authentication methods or procedures may be employed that positively identify the account holder 30, e.g., challenge response, quick log mode, other one or more factor authentication methods (such as a static user name and password or PIN), smart cards, the aforementioned number dispenser, biometric authentication (such as fingerprint recognition or retinal scanners), etc. These authentication techniques ensure that the coordinator 10 is able to independently make a positive identification of the account holders 30.

With particular reference now to FIG. 6A, next, the account holder 30 requests, or the coordinator's server 12 otherwise displays, a web page or the like with a shopping directory 330 listing participating merchants or sellers 20 that are registered with the transaction processing system A system administered by the coordinator 10. The account holder 30 is then free to select the participating seller 20 of his choice and shop as a pre-authenticated account holder 30a.

With particular reference now to FIG. 6B, alternately, the account holder 30 accesses the seller's online store or Internet shopping site directly from the seller's server 22 and shopping is carried out absent pre-authentication. At the seller's site, the buyer or account holder 30 selects items 340 of goods and/or services which are desired for purchasing. Preferably, these goods or services are then placed into a virtual shopping cart 342. If more shopping is desired, the process loops back to product selection and other like shopping web pages made available from the seller's server 22. On the other hand, if shopping is complete, the process continues on to check-out 350. When the buyer or account holder 30 accesses the transaction object 126 or link previously established on the participating merchant's or seller's check-out page 350, the buyer or account holder 30 is routed to the coordinator 10 along with a purchase request 352 indicating the buyer desires to carry out a commercial transaction with the referring participating seller 20. Preferably, the transaction in question includes the buyer or account holder 30 purchasing one or more selected items from the participating merchant or seller 20.

If not pre-authenticated, when the buyer or account holder 30 is routed to the coordinator 10, they are presented with an authentication page from the coordinator's server 12. At this point, using the same authentication procedure 310 as used in pre-authentication, the buyer is authenticating and/or positively identified as an account holder 30 having a unique user identity. If pre-authenticated, the account holder 30 bypasses this authentication step.

In any event, provided authentication is complete and successful, the coordinator 10, at process step 360, establishes transaction fulfillment data 362. The transaction fulfillment data 362 identifies information which is used by the participating seller 20 to fulfill their obligation(s) to the account holder 30 for the commercial transaction in which they are currently engaged. For example, the transaction fulfillment data 362 preferably includes a delivery destination for the items selected for purchase in the transaction. For physical goods, the delivery destination may be a shipping address, and for downloaded content, downloaded software, digital goods or services, and other like items, the delivery destination may be an e-mail address or the account holder's networked computer 32.

Figure 6C:
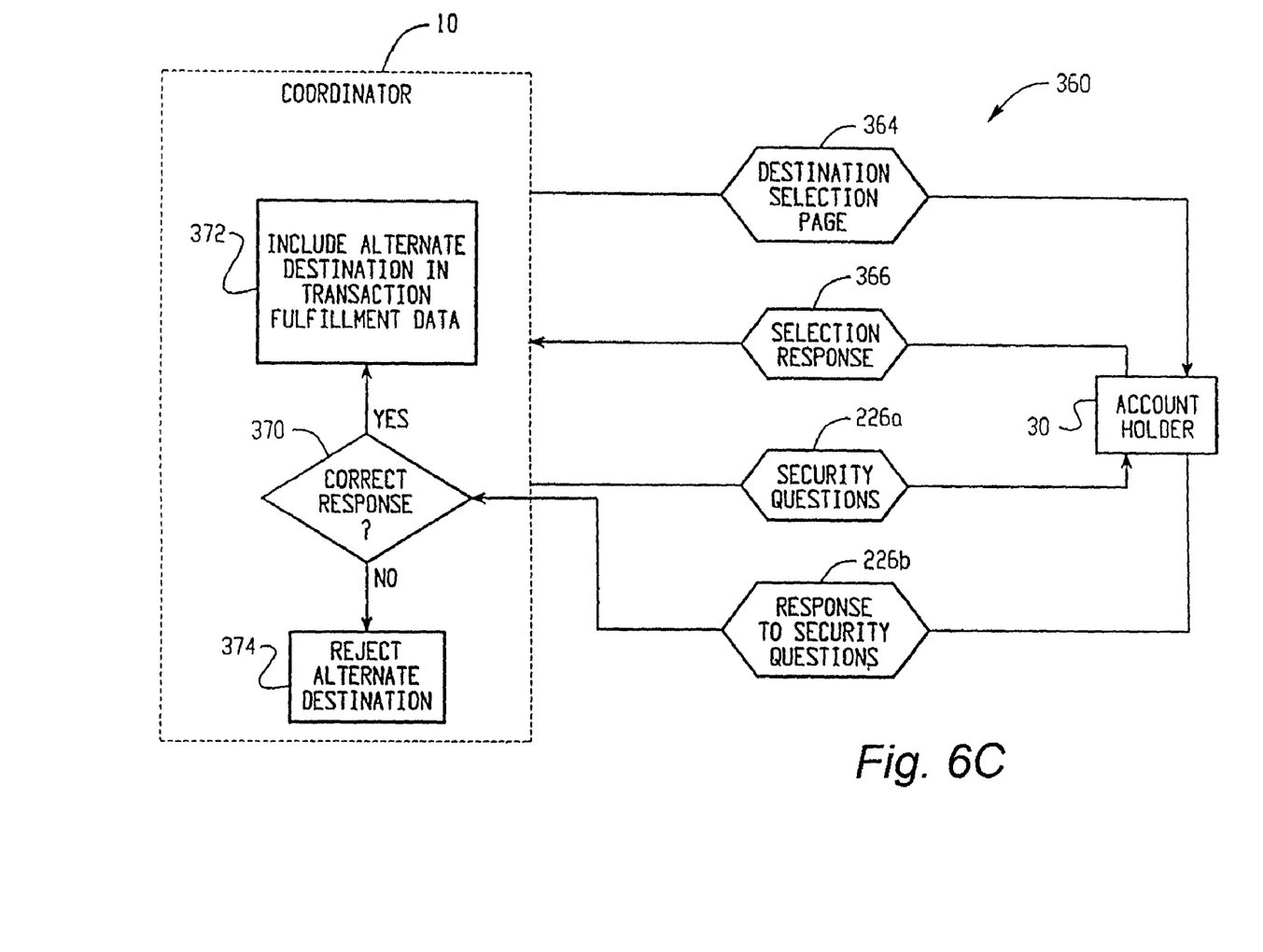
FIG. 6C is a flow chart showing implementation of additional security measures invoked by certain delivery destination conditions which are selected in connection with an online credit/debit transaction processing system in accordance with aspects of the present invention.

With further reference to FIG. 6C, in a preferred embodiment, previously designated (e.g., at account creation) default delivery destinations for the various types of goods or services are maintained in the account holder's record. As a rule, the coordinator 10 uses these default designations in establishing the transaction fulfillment data 362. However, at a destination selection web page 364 presented to the account holder 30 by the coordinator 10, the account holder 30 may optionally designate, via a selection response 366, an alternate destination as the delivery destination.

In a preferred embodiment, if the alternate destination differs from the default destination or if the destination is a direct download to the buyer's or account holder's computer 32, an additional security precaution is invoked. More specifically, the coordinator 10 transmits one or more of the previously answered security questions 226a (i.e., the security questions to which the account holder 30 originally provided answers in connection with the submitted additional account creation data 226) to the buyer or account holder 30. The coordinator 10 then receives from the buyer or account holder 30 an answer 226b in response to each security question. The coordinator 10 then determines, at decision step 370, if the answers 226b are correct. As shown at process step 372, only when the newly received responses match the previously given answers in the account holder's record is the alternate or download destination included in the established transaction fulfillment data 362. Otherwise, as shown at process step 374, the alternate or download destination is rejected. Optionally, approved alternate destinations may also be stored in an account holder address book maintained with the account holder's record for convenient future access and use by the account holder 30.

Optionally, the delivery destination is a non-identifying destination such that anonymity of the account holder 30 is maintained with respect to the participating merchant or seller 20. For example, the non-identifying destination may be a post office box, or other neutral third party from which delivered goods are obtained by the account holder 30. Regardless of the delivery destination, once established, the transaction fulfillment data 362 is communicated by the coordinator 10, preferably online or over the Internet 50, to the participating seller 20, and the account holder 30 is routed back the participating seller 20 where they are optionally presented a shipping choice 380 including choice of shipping carrier (e.g., regular U.S. mail, Federal Express, UPS, etc.) and/or preferred shipping time (e.g., 1 month, 1 week, or next day delivery).

After the account holder 30 has made their selection 382, if any, with regard to shipping carrier and/or preferred shipping time, the transaction details 384 are transmitted from the seller 20 to the coordinator 10 where they are received for authorization processing 390. The transaction details 384 preferably include the total cost (with tax and shipping) for the selected items being purchased in the transaction. Additionally, the transaction details 384 identify the participating merchant or seller 20 and account holder 30 engaged in the transaction.

The authorization process 390 preferably has two parts, one is based upon the account holder's account having an amount of available credit or funds sufficient to cover the total cost of the transaction, the other is based upon the transaction details 384 not violating the limitations and/or restrictions set forth in the account privileges of the account holder record. If the transaction details 384 are not within the boundaries of a virtual purchase order and/or other global restrictions that may have been set up by the account holder 30, then authorization is denied. Otherwise, the authorization process 390 determines the availability of funds or credit. Optionally, if the account privileges have been violated in any way, a notification or warning regarding the same is forwarded to the account holder 30, preferably, via email. In response to the warning, the account holder 30 may be given the option to override the denial of authorization, in which case authorization will be given.

Alternately, the account is optionally a debit account such that authorization is based upon the debit account having a sufficient amount of funds on deposit to cover the total cost of the transaction, or the account is a credit account such that authorization is based upon the credit account having a sufficient amount of available credit to cover the total cost of the transaction. In either case, when a sufficient amount of funds or credit is available to cover the total cost of the transaction, completion of the transaction is authorized, if not authorization is denied.

Optionally, the status of the account holder's account (credit or debit) is maintained along with the account holder's record in the coordinator's database 14 such that the coordinator 10 may directly authorize transactions. Alternately, the transaction details 384 are passed along to the funding source 40 which then authorizes the transactions. In either case, upon determining authorization (in the affirmative or in the negative), a corresponding authorization code 392 is established for the transaction. Preferably, the authorization code 392 along with the authorization result and the corresponding transaction details 384 are maintained in a transaction record, optionally, stored electronically in the coordinator's database 14. Additionally, an indication of the authorization outcome and the authorization code 392 are communicated to the participating merchant or seller 20 and account hold 30 which then act accordingly.

Figure 7:
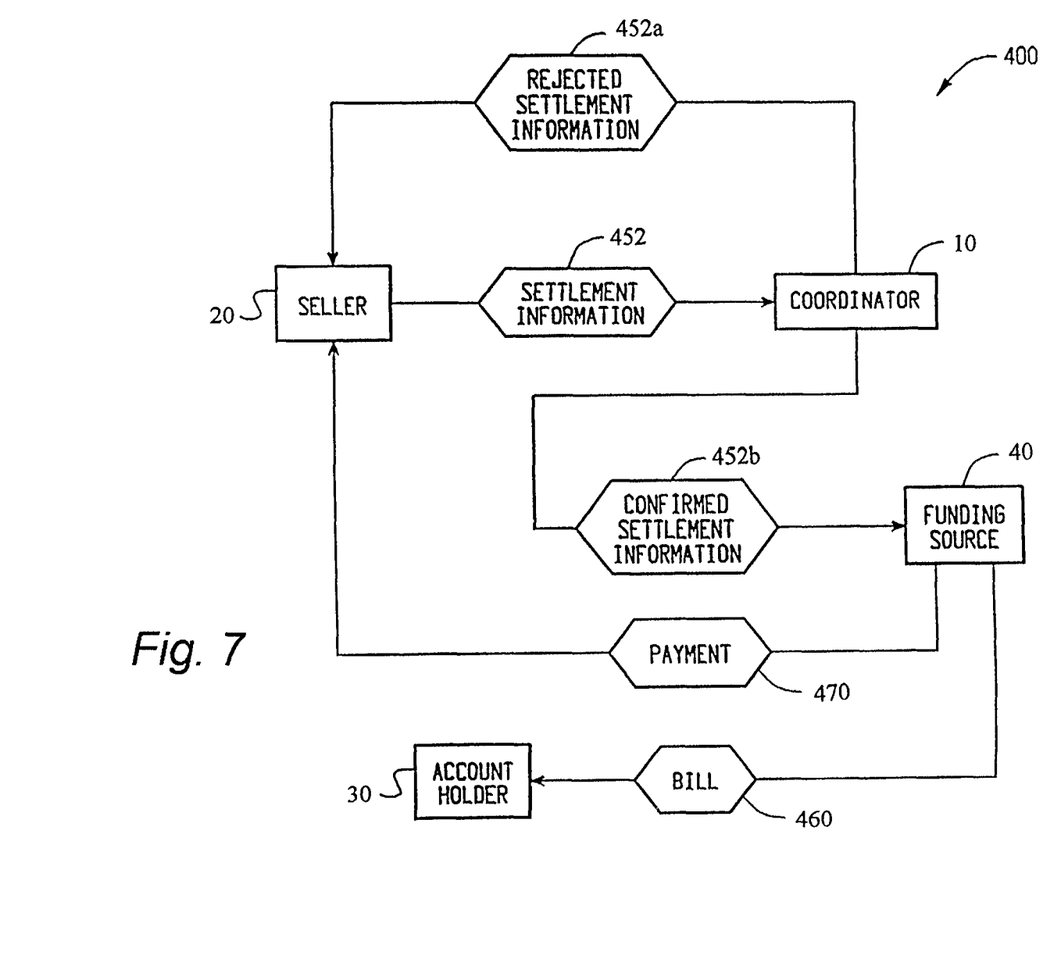
FIG. 7 is a flow chart showing a settlement process of an online credit/debit transaction processing system in accordance with aspects of the present invention.

With further reference to FIG. 7, the settlement process 400 for completed commercial transactions begins with the coordinator 10 collecting or otherwise obtaining settlement information 402 from the seller 30. Preferably, the settlement process 400 occurs periodically, e.g., daily, weekly, etc. Alternately, the settlement information 402 is obtained by the seller 20 routing settlement information 402 to the coordinator 10 or by the coordinator 10 automatically extracting settlement information 402 from the seller 20. For example, with regard to the automatic extraction of settlement information, when a seller's delivery process is executed thereby delivering purchased goods or services to the account holder 30, a seller's inventory database 24 (see FIG. 2) or other such seller database is accordingly updated to indicate delivery and completion of the particular transaction. In the settlement procedure 400 then, settlement information 402 corresponding to those transactions indicated in the seller's database 24 as having been completed is automatically retrieved by the coordinator 10 from the seller's database 24.

The settlement information 402 indicates that the seller 20 has fulfilled his obligations to an account holder 30 in connection with a particular authorized commercial transaction. The obtained settlement information 402 preferably includes the authorization code 392 and the corresponding transaction details 384 for the transaction in question. The coordinator 10 then matches the settlement information 402 to the corresponding transaction record having the same authorization code 392 to confirm or otherwise validate and approve settlement when the transaction details 384 in the settlement information 402 are substantially the same as the transaction details 384 in the transaction record. In particular, the total cost from the transaction details 384 reported in the settlement information 402 is optionally permitted to vary within a given tolerance from the total cost contained in the transaction details 384 of the transaction record. In the cases where there is an insufficient match, rejected settlement information 402a is returned to the seller 20.

In a preferred embodiment, periodically (e.g., at the end of each day), the coordinator 10 communicates confirmed settlement information 402b directly to the funding source 40, preferably over the Internet 50 or other online network. In turn, the funding source 40 acts accordingly on the confirmed settlement information 402b, e.g., sending bills 410 to the appropriate account holders 30 and reimbursing the appropriate merchants or sellers 20 with payment 420 using known billing and payment processing procedures and methods. As the settlement information 402 has already been confirmed by the coordinator 10, optionally, the funding source 40 does not employ independent confirmation of the settlement information 402 and thus may act on the confirmed settlement information 402b more readily without additional procedures for validating it.

In this manner, transactions conducted in the transaction processing system A are streamlined as compared to traditional transaction processing systems. In the traditional system, buyers or account holders make purchases using a traditional credit card. The credit card number, expiration date, and accompanying personal information is then forwarded to numerous different intermediaries in an attempt to positively identify and/or authenticate the buyer as the credit card owner. Still further intermediaries are often employed to then authorize a particular transaction and the information is again routed to these additional intermediaries. As a result this system is inherently inefficient. In the transaction processing system A described herein, by providing positive user identification and/or authentication at check-out through the coordinator 10 and by integrating the authentication and authorization procedures 310 and 390, respectively, with the coordinator 10, desirable efficiencies are gained insomuch as the inefficient merchant banking system and the numerous intermediaries are avoided on both the purchase side and the settlement side.

The invention has been described with reference to the preferred embodiments. Obviously, modifications and alterations will occur to others upon reading and understanding the preceding detailed description. For example, the transaction processing system A is equally applicable to and adept at handling face-to-face transactions, telephone transactions, and the like, as it is at handling Internet transactions. It is intended that the invention be construed as including all such modifications and alterations insofar as they come within the scope of the appended claims or the equivalents thereof.

Having thus described the preferred embodiment(s), the invention is now claimed to be:

1. A method of processing commercial transactions carried out over the Internet between account holders and participating merchants, said method comprising the steps of:
   (a) establishing account privileges defining boundaries outside of which transactions are not to be authorized for each account holder's account, said privileges including merchant-specific virtual purchase orders selectively set up by the account holders via manipulation of the account privileges, wherein those transactions which fall under the virtual purchase orders are authorized;
   (b) receiving a buyer's purchase request from a participating merchant indicating that the buyer desires to carry out a transaction with the merchant, said transaction including the buyer purchasing one or more selected items from the merchant;
   (c) authenticating the buyer as an account holder in response to receiving the buyer's purchase request, wherein the authenticating is performed by a processor;
   (d) receiving transaction details from the participating merchant after authenticating the buyer, said transaction details including a cost for the selected items; and,
   (e) authorizing completion of the transaction when the transaction details do not violate established account privileges and the account holder's account is full enough to cover the cost, wherein the authorizing is performed by a processor.

2. The method according to claim 1, wherein the boundaries defined by the account privileges preclude selected merchants from having transactions authorized for completion.

3. The method according to claim 1, wherein the boundaries defined by the account privileges preclude single transactions over a designated cost limit from being authorized for completion.

4. The method according to claim 1, wherein the boundaries defined by the account privileges preclude from being authorized for completion transactions within a determined time period having an aggregate cost over a designated cost limit.

5. The method according to claim 1, wherein the boundaries defined by the account privileges preclude from being authorized for completion transactions occurring outside a defined time frame.

6. The method according to claim 1, wherein the boundaries defined by the account privileges preclude from being authorized for completion transactions occurring at a rate faster than a defined frequency.

7. The method according to claim 1, further comprising the step of:
   (f) notifying an account holder when transaction details are received that violate that account holder's account privileges.

8. The method according to claim 7, further comprising the steps of:
   (g) receiving from the account holder an override request in response to a notice that the transaction details violate the account holder's account privileges; and,
   (h) authorizing completion of the transaction.

9. The method according to claim 1, wherein at least one of the virtual purchase orders persists for a plurality of matching transactions.

10. The method according to claim 1, wherein the account privileges are independent of account balance and/or account credit limit.

11. The method of claim 1, further comprising:
   (f) communicating settlement information of the transaction to a funding source.

12. The method of claim 11, said communicating comprising:
   establishing a transaction record for the transaction if the transaction is authorized for completion;
   retrieving the settlement information from the participating merchant;
   comparing the settlement information to the transaction record to confirm the authenticity of the settlement information;
   communicating confirmed settlement information to the funding source.

13. The method of claim 11, wherein the funding source acts on the settlement information without independent confirmation.

14. The method of claim 1, wherein the authenticating includes providing an authentication page to the buyer and receiving authentication credentials from the buyer via the authentication page.

15. The method of claim 1, wherein the authenticating is conducted upon receiving the buyer's purchase request.

16. The method of claim 1, said method further comprising:
   providing transaction fulfillment data to the participating merchant, wherein the transaction fulfillment data is used by the participating merchant to complete the transaction.

17. The method of claim 16, wherein the transaction fulfillment data includes information from the buyer's account.

18. The method of claim 1, wherein the method is carried out by a third party different than the participating merchant and buyer.

* * * * *